United States Patent
Desai et al.

(10) Patent No.: US 8,840,962 B2
(45) Date of Patent: Sep. 23, 2014

(54) SUBSTANTIALLY DEFECT-FREE SOUND AND VIBRATION DAMPING COATING

(75) Inventors: Umesh C. Desai, Wexford, PA (US); Shanti Swarup, Allison Park, PA (US); Kaliappa G. Ragunathan, Allison Park, PA (US); Paul Pcolinsky, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 410 days.

(21) Appl. No.: 12/779,985

(22) Filed: May 14, 2010

(65) Prior Publication Data

US 2011/0281978 A1    Nov. 17, 2011

(51) Int. Cl.
| | | |
|---|---|---|
| *B05D 1/00* | (2006.01) | |
| *C08L 1/00* | (2006.01) | |
| *C09D 7/12* | (2006.01) | |
| *C08G 71/04* | (2006.01) | |
| *C09D 5/02* | (2006.01) | |
| *C08K 7/02* | (2006.01) | |
| *C08K 3/00* | (2006.01) | |

(52) U.S. Cl.
CPC ............... *C09D 5/024* (2013.01); *C09D 7/125* (2013.01); *C08G 71/04* (2013.01); *C09D 7/1216* (2013.01); *C09D 7/1291* (2013.01); *C08K 7/02* (2013.01); *C08K 3/0033* (2013.01); *C08L 2207/53* (2013.01)

USPC .......... 427/385.5; 524/35; 524/198; 524/280; 524/765

(58) Field of Classification Search
USPC ..................... 524/35, 198, 280, 765
See application file for complete search history.

(56) References Cited

U.S. PATENT DOCUMENTS

| | | | |
|---|---|---|---|
| 3,894,169 A * | 7/1975 | Miller ............... 428/414 |
| 5,547,757 A | 8/1996 | Swarup et al. |
| 6,531,541 B1 | 3/2003 | Desai et al. |
| 6,872,761 B2 | 3/2005 | LeStarge |
| 7,288,595 B2 | 10/2007 | Swarup et al. |
| 2008/0039564 A1 | 2/2008 | Desai et al. |

OTHER PUBLICATIONS

ASTM 756-93, Standard test method for measuring vibration damping properties of materials, 2013.*

* cited by examiner

*Primary Examiner* — Ling Choi
*Assistant Examiner* — Wenwen Cai
(74) *Attorney, Agent, or Firm* — Alicia M. Passerin

(57) ABSTRACT

The present invention is directed to a coating composition comprising: (i) an aqueous dispersion of polymeric particles; (ii) a polyether carbamate compound; (iii) a filler material; and (iv) an microparticle; and wherein after application to a substrate and after curing, the cured coating composition demonstrates a composite damping Loss Factor of 0.05 or greater at a frequency ranging from 100 to 6,300 Hz and comprises a surface that is substantially free of defects.

23 Claims, No Drawings

SUBSTANTIALLY DEFECT-FREE SOUND AND VIBRATION DAMPING COATING

BACKGROUND OF THE INVENTION

1. Field of the Invention

The present invention relates generally to sound damping coating compositions.

2. Background Information

Automotive OEM have used precut asphalt- or rubber-based patches as liners for floor pans, deck lids and doors of automobiles in order to dampen and/or reduce road and/or engine noise and vibrations thereby preventing these sounds from permeating into the passenger compartment of the motor vehicle. Sprayable coating compositions, which are capable of being applied by robotics, are desirable for a number of reasons. For example, these coating compositions typically provide labor, reduced part inventories, flexibility in design specifications for damping properties as well as other cost savings over their asphalt/rubber based counterparts. At times, waterborne or high solids coating compositions are used in applications where only air dry cure is feasible.

Traditionally, when an aqueous based sound damping coating composition is applied onto a substrate and allowed to dry, the evaporation of water from the coating composition during automotive bake conditions can result in defects in the dried coating. As used herein, "defects" means the pita defects or pita gaps that can occur in a coating as it dries. In general, pita can be described as an area in the coating layer where the coating layer has separated thereby leaving an air pocket. In some instances, the length of the pita gap can extend more than 13 mm when measured along a plane that is substantially parallel to the surface of the substrate when a coating layer having the approximate dimensions of 75 mm (L)×75 mm (W)×2 mm (T) is applied onto the substrate. In other instances, the length of the pita gap can extend approximately 75% of the coating layer described in the preceding sentence. It will also be noted that these defects can occur not only near the surface of the coating layer, but in the bulk region of the coating layer as well as near the interface between the coating layer and the substrate.

SUMMARY OF THE INVENTION

The present invention is directed to a coating composition comprising: (i) an aqueous dispersion of polymeric particles; (ii) a polyether carbamate compound; (iii) a filler material; and (iv) an microparticle; and wherein after application to a substrate and after curing, the cured coating composition demonstrates a composite damping Loss Factor of 0.05 or greater at a frequency ranging from 100 to 6,300 Hz and comprises a surface that is substantially free of defects. The present invention is also directed to a method of coating at least a portion of a substrate with the coating composition described in this paragraph as well as to a substrate that is coated with the coating composition.

DETAILED DESCRIPTION OF THE INVENTION

As used herein, unless otherwise expressly specified, all numbers such as those expressing values, ranges, amounts or percentages may be read as if prefaced by the word "about", even if the term does not expressly appear. When referring to any numerical range of values, such ranges are understood to include each and every number and/or fraction between the stated range minimum and maximum. For example, a range of "1 to 10" is intended to include all sub-ranges between (and including) the recited minimum value of 1 and the recited maximum value of 10, that is, having a minimum value equal to or greater than 1 and a maximum value of equal to or less than 10. As employed herein, the term "number" means one or an integer greater than one.

As used herein, plural phrases or terms encompasses their singular counterparts and vice versa, unless specifically stated otherwise. By way of illustration, and not limitation, although reference is made herein to "a" polyether carbamate compound, "an" aqueous dispersion of polymeric particles, "a" filler material, "a" microparticle; a plurality of these materials may be used in the present invention. As used herein, "plurality" means two or more.

As used herein, "includes" and like terms means "including without limitation."

As used herein, the use of "or" means "and/or" unless specifically stated otherwise, even though "and/or" may be explicitly used in certain instances.

As used herein, "molecular weight" means weight average molecular weight (Mw) as determined by Gel Permeation Chromatography.

As used herein, the term "cure" refers to a process wherein the crosslinkable components of a coating are at least partially crosslinked. In certain embodiments, the crosslink density of the crosslinkable components (i.e., the degree of crosslinking) ranges from 5% to 100%, such as 35% to 85%, or, in some cases, 50% to 85% of complete crosslinking. One skilled in the art will understand that the presence and degree of crosslinking, i.e., the crosslink density, can be determined by a variety of methods, such as dynamic mechanical thermal analysis (DMTA) using a Polymer Laboratories MK III DMTA analyzer conducted under nitrogen.

Reference to any monomer(s) herein refers generally to a monomer that can be polymerized with another polymerizable component such as another monomer or polymer. Unless otherwise indicated, it should be appreciated that once the monomer components react with one another to form a compound, the compound will comprise the residues of such monomer components. For example, a reaction product comprising polyoxyalkylene amine and a carbonate means that the reaction product will comprise the residues of the polyoxyalkylene amine and the carbonate.

Coating Composition

The present invention is directed to a coating composition that has a surface that is substantially free and/or completely free of defects after the coating composition has been applied onto a substrate and cured. The cured coating composition or coating layer also demonstrates a composite damping Loss Factor of 0.05 or greater at a frequency ranging from 100 to 6,300 Hz. As used herein, "substantially and/or completely free of defects" means that the cured coating layer contains no more than one pita gaps in an area of 75 $mm^2$. In some embodiments, no pita gaps are found in such an area.

As stated above, the coating composition of the present invention comprises (i) an aqueous dispersion of polymeric particles; (ii) a polyether carbamate compound; (iii) a filler material; and (iv) a microparticle. In certain embodiments, the coating composition of the present invention is a waterborne coating composition. In certain embodiments, component (ii) is optional.

Component (i) comprises an aqueous dispersion of polymeric particles. The polymeric particles comprise a reaction product of ethylenically unsaturated monomers. Examples of suitable monomers that may be used in the present invention include, without limitation, (meth)acrylate monomers (e.g., (meth)acrylic acid and/or derivatives), styrene, vinyl esters (e.g., vinyl acetate), (meth)acrylonitrile, (meth)acrylamide, or combinations thereof. In certain embodiments, one or more of the ethylenically unsaturated monomers comprise a functional group. Suitable functional groups include, without limitation, hydroxyl, carboxyl, epoxy, sulfonic, phosphoric, carbamate, amine, urea, cyclic urea, amide, or combinations thereof. In some embodiments, one or more of the monomers comprise a urethane moiety. In some embodiments, the urethane containing monomer can be formed by reacting hydroxyl ethyl(meth)acrylate, a polyisocyanate, and a mono-alcohol using techniques known in the art. At times, the molar ratio of the hydroxyl ethyl(meth)acrylate, polyisocyanate, and mono-alcohol can be 1:1:1. In some embodiments, the polymeric particles of component (i) comprise a core-shell morphology. That is, a polymeric shell may be polymerized over a polymeric core.

In certain embodiments, the polymeric particles comprise reactive functional groups such as hydroxyl groups as well as acid groups (e.g., carboxylic acid groups). These reactive functional groups can extend from the surface of the polymeric shell. Accordingly, in some embodiments, the coating composition disclosed herein further comprises a crosslinking agent or curing agent. Two examples of crosslinking agents that can be used to react with hydroxyl or carboxylic acid functional groups include, without limitation, epoxy and/or melamine compounds (e.g., EPONEX 1510, and CYMEL 303).

The size of the polymeric particles can range from 30 nm to 900 nm. For example, in certain embodiments, the polymeric particles can range in size from 50 nm to 400 nm, such as from 100 nm to 300 nm.

The monomers can be added to a suitable reaction vessel and the reaction process can be conducted at temperatures ranging from 70° C. to 95° C. for a time period ranging from 1 hour to 6 hours. In addition to the monomers, the reaction vessel can also be charged with catalysts, surfactants, and/or initiators, which are known in the art. One method of making the aqueous dispersion is disclosed in U.S. Pat. No. 6,531,541 from column 7, line 41, to column 10, line 13, the cite portion being incorporated herein by reference.

Component (ii) of the coating composition comprises a polyether carbamate compound. In certain embodiments, the polyether carbamate compound is the reaction product of a polyoxyalkylene amine and a carbonate, such as a linear or cyclic carbonate. Suitable polyoxyalkylene amines that may be used include, without limitation, polyoxyalkylene monoamines, polyoxyalkylene diamines, polyoxyalkylene triamines, polyoxy tetramine, or combinations thereof. In certain embodiments, the polyoxyalkylene diamine comprises a compound having the following structure:

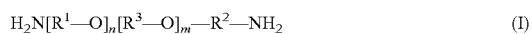

$$H_2N[R^1-O]_n[R^3-O]_m-R^2-NH_2 \quad (I)$$

wherein each $R^1$, $R^2$, and $R^3$ can be the same or different and each can independently represent a $C_2$ to $C_{12}$ alkylene group; and wherein (n+m) is a value greater than 2.

Suitable cyclic carbonates that may be used to for the polyether carbamate compound of component (ii) include, without limitation, ethylene carbonate, propylene carbonate, butylene carbonate, glycerine carbonate, or combinations thereof.

In some embodiments, the polyether carbamate compound is made by charging a suitable reaction vessel with the polyoxyalkylene amine and the cyclic carbonate. In some embodiments, the polyoxyalkylene amine and the cyclic carbonate are used in amounts that is sufficient to yield an equivalents ratio of polyoxyalkylene amine to cyclic carbonate ranging from 1:0.5 to 1:1.15. The reaction vessel is then heated to a temperature ranging from 20° C. to 150° C. for a time period ranging from 1 hour to 10 hours thereby forming the polyether carbamate compound.

Component (iii) of the coating composition of the present invention comprises a filler material. Suitable fillers include, without limitation, mica, powdered slate, montmorillonite flakes, glass flakes, metal flakes, graphite, talc, iron oxide, clay minerals, cellulose fibers, mineral fibers, carbon fibers, glass or polymeric fibers or beads, ferrite, calcium carbonate, calcium, magnesium carbonate, barytes, ground natural or synthetic rubber, silica, aluminum hydroxide, alumina powder, fiberglass, titanium dioxide fibers, and mixtures thereof. Accordingly, in certain embodiments, the filler comprises an inorganic filler material. In certain embodiments, the filler material can also comprise a polymeric filler material (e.g., chitin).

The filler material can comprise 20 to 90 weight percent of the coating composition based on the total weight of the coating composition. In certain embodiments, the filler material can comprise from 50 to 80 weight percent of the coating composition based on the total weight of the coating composition.

Component (iv) of the coating composition comprises a microparticle. Suitable materials that may be used as the microparticle include, without limitation, chitin, silica derived from rice hull, glass beads (e.g., spherical glass beads), hollow or solid polymeric beads (e.g., expandable microspheres and/or beads), rubber (e.g., rubber that has been grounded to microparticle size), precipitated calcium carbonate, precipitated silica, fumed silica, or combinations thereof. While the materials listed in connection with component (iii) above can also be used as the microparticle of component (iv), it is noted that the material used as component (iii) and the material used as component (iv) will be different and not the same. For example, if glass flakes are used as the microparticles of component (iv), then component (iii) will not comprise glass flakes. Rather, it can be any of the other materials listed above.

In certain embodiments, the (iv) microparticle comprises from 5 weight percent to 30 weight percent of the coating composition based on the total weight of the composition. In some embodiments, the (iv) microparticle can comprise from 10 weight percent to 25 weight percent of the coating composition based on the total weight of the composition.

In certain embodiments, the coating composition of the present invention further comprises a solution comprising resorcinol and a carbonate compound. In certain embodiments, the carbonate compound comprises propylene carbonate.

The coating composition described above can further comprise one or more polymeric film-forming materials chemically different from the polymeric microparticles discussed above. Useful polymeric film-forming materials include polyepoxides, polyurethanes, polyamides, polyesters, polyacrylates, polyvinyl chlorides, or mixtures thereof. In certain embodiments, these polymeric film-forming materials comprise a reactive functional group selected from the group comprising hydroxyl, carboxyl, carbamate, epoxy, isocyanate, aceto acetate, amine-salt, mercaptan, and combinations thereof. If a polymeric film-forming material comprises a reactive functional group, then the coating composition may also comprise a curing agent or crosslinking agent that is reactive with the reactive functional group of the polymeric film-forming material. Suitable crosslinking agents that may be used include, without limitation, aminoplasts, polyisocyanates (including blocked isocyanates), polyepoxides, beta-hydroxyalkylamides, polyacids, anhydrides, organometallic acid-functional materials, polyamines, polyamides, cyclic carbonates, siloxanes, or combinations thereof Selection of the appropriate type of crosslinking agent will depend on the reactive functional groups of the polymeric film-forming material.

In some embodiments, a polyacrylate film-forming material such as ACRONAL DS 3502 polyacrylate copolymer emulsion prepared from methyl acrylate, butyl acrylate, methyl methacrylate and methacrylic acid is included in the coating composition.

Generally, the film-forming material is present in the coating composition in an amount ranging from 1 weight percent to about 40 weight percent, such as, from about 5 weight percent to 30 weight percent, based on the total resin solids of the coating composition.

Additionally, one or more plasticizers can be included in the coating composition described in the preceding paragraphs. Suitable plasticizers that may be used include, without limitation, adipates, benzoates, glutarates, isophthalates, phosphates, (poly)esters, sebacates, mellitates (e.g., trimellitate), azelate, citrate, sulfonamides, terephthalates, glycol, benzyl phthalate, or combinations thereof. The amount of plasticizer can range from 0.1 weight percent to 50 weight percent based on the total weight of the coating composition.

The coating composition of the present invention can also include a variety of optional ingredients and/or additives that are somewhat dependent on the particular application of the composition. These optional ingredients and/or additives include, without limitation, dyes or pigments, such as carbon black or graphite, reinforcements, thixotropes, accelerators, surfactants, extenders, stabilizers, corrosion inhibitors, diluents, blowing agents, antioxidants, or combinations thereof. Suitable thixotropes include, without limitation, fumed silica, bentonite, stearic acid-coated calcium carbonate, cellulose, fatty acid/oil derivatives and associative urethane thickeners, such as RM-8 which is commercially available from Rohm and Haas. Thixotropes are generally present in an amount of up to about 20 weight percent based on the total weight of the coating composition.

Optional additional ingredients also include, without limitation, carbon black or graphite, blowing agents, expandable polymeric microspheres or beads, such as polypropylene or polyethylene microspheres, surfactants, and corrosion inhibitors like barium sulfonate. These ingredients are generally present in an amount of less than about 5 weight percent based on the total weight of the coating composition.

The viscosity of the coating composition disclosed herein is application-specific. Accordingly, the user will factor in the type of equipment to be used to apply the coating composition, required film thickness as well as desired sag resistance. In some embodiments, the coating composition has a viscosity ranging from 60,000 cp to 160,000 cp, such as from 70,000 cp to 120,000 cp or 80,000 cp to 110,000 cp, at 20 RPM reading on the Brookfield viscometer at ambient temperature (25° C.).

In some embodiments, the coating composition described above can also be prepared by mixing components (i) through (iv) in addition to any optional ingredients, if any, in a high energy vacuum mixer, such as Dual Disperser Model HHL-2-1000 (commercially available from Hockmeyer). The components are mixed until they are substantially homogenous, which usually occurs within two to six hours. During this time, the material is kept below 32.2° C. This can be accomplished by surrounding the mixer with a cooling jacket which is known in the art. In certain embodiments, the vacuum is applied towards the end of the mixing operation to obtain a substantially air-free mixture.

Coating System

The coating composition described above may be applied alone or as part of a coating system that can be deposited onto a number of different substrates. The coating system typically comprises a number of coating layers. A coating layer is typically formed when a coating composition that is deposited onto the substrate is substantially cured by methods known in the art (e.g., by thermal heating). It is noted that the coating composition described above can be used in one or more of the coating layers described in the following paragraphs.

Suitable substrates that can be coated with the coating composition comprising the polymer include, without limitation, metal substrates, metal alloy substrates, substrates that have been metallized, such as nickel plated plastic, and/or plastic substrates. In some embodiments, the metal or metal alloy can be aluminum and/or steel. For example, the steel substrate could be cold rolled steel, electrogalvanized steel, and/or hot dipped galvanized steel. Moreover, in some embodiments, the substrate may comprise a portion of a vehicle such as a vehicular body (e.g., without limitation, door, floor-pan, fire-wall, wheel t, wheel-house, body panel, trunk deck lid, roof panel, hood, and/or roof) and/or a vehicular frame. As used herein, "vehicle" or variations thereof includes, but is not limited to, civilian, commercial, and military land vehicles such as cars, motorcycles, and trucks. It will also be understood that, in some embodiments, the substrate may be pretreated with a pretreatment solution, such as a zinc phosphate solution as described in U.S. Pat. Nos. 4,793,867 and 5,588,989 or not pretreated with a pretreatment solution.

In a conventional coating system used in the automotive industry, a pretreated substrate is coated with an electrodepositable coating composition. The electrodepositable coating composition is then cured prior to application of subsequent coating compositions. In certain embodiments, the coating composition described above can be applied onto at least a portion of the cured electrodepositable coating composition. In other embodiments, however, the coating composition of the present invention may be applied to a substrate that lacks an electrodepositable coating layer. That is, the coating composition can be applied onto the surface of the substrate regardless of whether the substrate has been subjected to a pretreatment step or not. In the case where the substrate has not been pretreated, the coating composition of the present invention is applied directly to the surface of the substrate without any intervening coating layers purposefully deposited between the coating layer and the substrate.

The methods by which the coating composition can be applied onto the substrate are known in the art. For example, the coating composition described above can be deposited onto the substrate by spraying, extrusion, or by hand with a blade. In certain embodiments, the coating composition is applied onto a substrate at a wet film thickness ranging from 1 mm to 6 mm depending on the damping requirements of the user. Typically, a thicker film will result in higher dampening properties. After application to the substrate, the coating composition can be air-dried or it can be subjected to a baking step, which can occur between a temperature ranging from 121° C. to 193° C. for a time period ranging from 5 minutes to 1 hour. In some embodiments, additional baking steps could be needed to accommodate specific paint system configurations. The dry film thickness of the coating layer can increase 0% to 300% from the applied wet film thickness depending on the speed of drying and the heat applied to the coating composition. After cure, the coating layer demonstrates a composite damping Loss Factor of 0.05 greater at a frequency ranging from 100 to 6,300 HZ. Moreover, after the coating composition is cured, it is substantially free of defects.

In other embodiments, other coating compositions (topcoats) known in the art (e.g., basecoat coating compositions and/or clearcoat coating compositions) may be applied onto at least a portion of the coating composition described above. Since these topcoats are known in the art, the techniques of applying such coating compositions and the methods by which they are cured will not be discussed further since these variables will be dependent on the particular topcoat used.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

EXAMPLES

Preparation of one example of the coating composition of the present invention as well as one comparative example is described below. Each of the raw materials listed below are in grams (q).

TABLE 1

| Component | Raw Material | Example 1 (Comparative) | Example 2 |
|---|---|---|---|
| 1 | Acrylic Latex[1] | 56.50 | 56.40 |
| 2 | 33.3% solution of DARVAN #1 in water[2] | 1.00 | 1.00 |
| 3 | BYK 024[3] | 0.40 | 0.40 |
| 4 | KLUCEL J[4] | 0.33 | 0.33 |
| 5 | Deionized water (DI water) | 3.00 | 3.00 |
| 6 | PROXEL GEL[5] | 0.02 | 0.02 |
| 7 | EXPANCEL 551 WU40[6] | 1.50 | 1.50 |
| 8 | VANSIL W-30[7] | 100.00 | 100.00 |
| 9 | SANTICIZER 278[8] | 3.50 | 3.50 |
| 10 | TEG[9] | 7.00 | 7.00 |
| 11 | IGEPAL CO997[10] | 2.00 | 2.00 |
| 12 | RAVEN 410[11] | 0.20 | 0.20 |
| 13 | WINNOFIL SPT[12] | 15.00 | 15.00 |
| 14 | EXTENDOSPHERE TG[13] | 20.00 | 20.00 |
| 15 | Reaction product of propylene carbonate and DYTEK A[14] | — | 2.00 |
| 16 | Reaction product of propylene carbonate and JEFFAMINE D400[15] | — | 6.00 |
| 17 | 3M Glass bubbles type VS 5500[16] | — | 7.00 |

[1]P8129 acrylic latex available from PPG Industries, Inc.
[2]Socium salts of polymerized alkyl available from R. T. Vanderbilt Co.
[3]Mixture of copolymers/polysiloxanes available from BYK Chemie
[4]Hydroxypropylcellulose available from Hercules Inc.
[5]1,2-Benzisothiazoline 3-one available from Arch Chemicals
[6]Acrylic copolymer wet available from Expancel
[7]Calcium silicate available from R. T. Vanderbilt Co.
[8]Alkyl benzyl phthalate available from Ferro Corp.
[9]Triethylene Glycol available from Ashland Inc.
[10]Nonylphenoxypoly(ethylenoxy)ethanol available from Rhodia
[11]Carbon black available from Phelps Dodge- Columbian Chemicals
[12]Precipitated calcium carbonate/stearate available from Solvay & CIE
[13]Glass oxide, mullite beads available from Sphere One Inc.
[14]Prepared pursuant to Example A of U.S. Pat. No. 7,288,595, but Jeffamine D400 was replaced by Dytek A based on amine equivalent weight
[15]Prepared pursuant to Example A of U.S. Pat. No. 7,288,595
[16]Soda lime borosilicate glass available from 3M In each of the Examples, the raw materials listed in Table 1 were mixed using a Speedmixer DAC 600 FVZ (commercially available from FlackTek, Inc.).

Two pre-mixes were prepared prior to formulating the coating compositions described in Table 1. One pre-mix was prepared by mixing Component 2 at 2350 rotations per minute (rpm) for about three minutes. The other pre-mix was prepared by mixing Components 4, 5, and 6 for two minutes at 2350 rpm and aging it overnight prior to use.

After the pre-mixes were prepared, Components 1, 2, the pre-mix of Components 4, 5, 6, as well as Components 7, 8 were weighed in a DAC mixing cup and mixed for one minute at 2350 rpm. Then Components 9, 10, 11, 12, 13, and 14 were added to the mixture in the amounts listed in Table 1 and the mixture mixed in the DAC mixer for one minute at 2350 rpm. Afterwards, Components 15, 16, and 17, if present, were added to the mixture and the mixture was mixed for another one minute at 2350 rpm. During the mixing process, the mixture was examined with a spatula to ensure uniformity as will be understood by those skilled in the art. The final step of the mixing process involved mixing the mixture with an air motor prop in a vacuum sealed apparatus for one minute at 28 to 30 inch of vacuum pressure. After the final mixing step with the air motor prop, the coating compositions were ready for testing.

Each of the coating compositions of Examples 1 and 2 were hand applied onto a 100 mm×100 mm automotive grade electrocoated steel substrate using a draw down template in order to form a coating layer have the dimensions of 75 mm (L)×75 mm (W)×2 mm (T). After application onto the substrate, the coating layer was air dried for 30 minutes followed by a 30 minute bake at 149° C. Each of the samples were cooled to room temperature for at least one hour, then the coating thickness was measured using a caliper, and % expansion was calculated for the average rise in thickness from the initial 2 mm wet stage. Then two side by side, about 10 mm apart, razor cuts were made across the panel and examined for adhesion and pita or gap separation, which may be 0.05 mm or larger and could be lifted up easily with a blade, within the coating. Coating between the razor cut was removed with a blade for examination.

Evidence of pita 75% or more across the cut was reported as "severe", 25% to 74% of pita across the cut was reported as "Fair", separation of 13 mm or smaller was reported as "partial pita", and "none" was reported when there were no pita defects across the cut.

TABLE 2

|  | Example 1 (Comparative) | Example 2 |
|---|---|---|
| % Expansion | 114 | 25 |
| Viscosity - #7 Spindle at 20 rpm at 25° C., 20 rpm | 100,000 | 109,000 |
| Pita | Severe | None |

Table 2 shows that the present invention, Example 2, surpasses Example 1 in the reduction of pita gaps from the coating layer.

Each of the coating compositions of Examples 1 and 2 were applied to a SAE J1637 specified type B Oberst Bar measuring 241 mm (L)×12.7 mm (W)×1 mm (9.5 inches×0.5 inch×0.38 inch). The coating compositions were applied to the Oberst bar with a template suitable to provide approximately 2 mm wet film thickness. 25 mm (2.54 cm) of the bar on one end, commonly known as root of the bar was left uncovered. Bars were air dried for 30 minutes at room temperature and 30 minutes at 300° F. to simulate automotive paint shop bake ovens before grinding the excess on edges to match bar's dimensions. Composite Damping Loss Factor (CDLF) measurements were done according to ASTM E-756 using a Data Physics SignalCalc analyzer from DataPhysics.

Table 3 shows Composite Damping Loss Factor (CDLF) for 2 to 5 modes at their resonance frequencies for two separate Oberst bar test specimen. The weight of the composite bars are reported to show similar amount of treatments.

TABLE 3

| Composite Damping Loss Factor (CDLF) | | | | |
|---|---|---|---|---|
| | Example 1 (Comparative) | | Example 2 | |
| | Damping Loss factor | Resonance Frequency | Damping Loss factor | Resonance Frequency |
| Sample 1 | CDLF | Hz | CDLF | Hz |
| 2nd mode | 0.182 | 116 | 0.134 | 107 |
| 3rd mode | 0.202 | 347 | 0.154 | 313 |
| 4th mode | 0.191 | 709 | 0.171 | 628 |
| 5th mode | | | 0.177 | 1057 |
| Actual wt., gm. | 6.8 | | 7.0 | |
| Sample 2 | CLF | Hz | CLF | Hz |
| 2nd mode | 0.191 | 120 | 0.126 | 108 |
| 3rd mode | 0.205 | 360 | 0.144 | 313 |
| 4th mode | 0.210 | 729 | 0.161 | 631 |
| 5th mode | | | 0.167 | 1063 |
| Actual wt., gm. | 6.6 | | 6.9 | |

As can be seen from Table 3, the coating composition of the present invention and the comparative examples provided greater than 0.1 CDLF results and are, therefore, acceptable to certain manufacturers in the automotive industry.

What is claimed is:

1. A coating composition for sound and vibration damping comprising: (i) an aqueous dispersion of polymeric particles; (ii) a polyether carbamate compound; (iii) a filler material; and (iv) a microparticle that is different from the (iii) filler material; wherein the coating composition has a viscosity from 60,000 to 160,000 centipoise measured at 20 RPM with a #7 spindle on the Brookfield viscometer at ambient temperature, and wherein after application to a substrate and after curing, the cured coating has a dry film thickness of at least 1 mm and is substantially free of defects.

2. The coating composition of claim 1, wherein the (i) polymeric particles comprise hydroxyl functionality.

3. The coating composition of claim 1, wherein the (iv) microparticle comprises rice hull, glass beads, or combinations thereof.

4. The coating composition of claim 1, wherein the (iii) filler material comprises cellulosic fibers, chitin, fiberglass, carbon fibers, titanium dioxide fibers, or combinations thereof.

5. The coating composition of claim 1, wherein the (i) polymeric particles comprise a core-shell morphology.

6. The coating composition of claim 1, wherein the (ii) polyether carbamate compound comprises a reaction product of a polyoxyalkylene amine and a carbonate.

7. The coating composition of claim 6, wherein the polyoxyalkylene amine comprises polyoxyalkylene diamine.

8. The coating composition of claim 7, wherein the polyoxyalkylene diamine comprises a compound having the following structure (I):

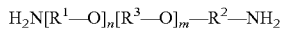

wherein each $R^1$, $R^2$, and $R^3$ can be the same or different and each can independently represent a $C_2$ to $C_{12}$ alkylene group; and wherein (n+m) is a value greater than 2.

9. The coating composition of claim 6, wherein the carbonate comprises propylene carbonate.

10. The coating composition of claim 1, further comprising a solution comprising resorcinol and a carbonate compound.

11. The coating composition of claim 10, wherein the carbonate compound comprises propylene carbonate.

12. The coating composition of claim 1, wherein the (i) polymeric particles comprise reactive functional groups and wherein the coating composition further comprises a curing agent that is reactive with the reactive functional groups of the polymeric particles.

13. The coating composition of claim 12, wherein the curing agent comprises an epoxy compound, a melamine compound, or combinations thereof.

14. The coating composition of claim 1, wherein the (iv) microparticle is expandable.

15. A substrate coated at least in part with the coating composition of claim 1.

16. A method of coating a substrate comprising depositing the coating composition of claim 1 onto at least a portion of the substrate; and curing at least a portion of the coating composition to form a coating layer; and wherein the coating layer has a dry film thickness of at least 1 mm and is substantially free of defects.

17. The method of claim 16, wherein the (ii) polyether carbamate compound comprises a reaction product of a polyoxyalkylene amine and a carbonate.

18. The method of claim 17, wherein the polyoxyalkylene amine comprises polyoxyalkylene diamines.

19. The method of claim 17, wherein the carbonate comprises propylene carbonate.

20. The method of claim 16, wherein the (i) polymeric particles comprise a reaction product comprising ethylenically unsaturated monomers.

21. The method of claim 20, wherein at least one of the ethylenically unsaturated monomers comprise a functional group, and wherein the functional group comprises hydroxyl, carbamate, amine, or combinations thereof.

22. The method of claim 20, wherein at least one of the ethylenically unsaturated monomers comprises a urethane moiety.

23. The method of claim 16, wherein the method further comprises combining a solution of resorcinol and a carbonate compound to components (i)-(iv).

\* \* \* \* \*